US009537922B2

(12) United States Patent
Anders et al.

(10) Patent No.: US 9,537,922 B2
(45) Date of Patent: Jan. 3, 2017

(54) PARTITIONING DIGITAL MEDIA FOR CONSUMPTION

(71) Applicant: International Business Machines Corporation, Armonk, NY (US)

(72) Inventors: Randal A. Anders, Round Rock, TX (US); Howard N. Anglin, Austin, TX (US); Chao M. Beck, Austin, TX (US); Joey A. Perry, Pflugerville, TX (US); Reginald F. Ratcliff, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/954,081

(22) Filed: Nov. 30, 2015

(65) Prior Publication Data

US 2016/0080458 A1   Mar. 17, 2016

Related U.S. Application Data

(63) Continuation of application No. 14/169,294, filed on Jan. 31, 2014, now Pat. No. 9,237,187.

(51) Int. Cl.
| | |
|---|---|
| G06F 15/16 | (2006.01) |
| H04L 29/06 | (2006.01) |
| H04L 12/26 | (2006.01) |
| H04L 29/08 | (2006.01) |
| G06Q 10/10 | (2012.01) |

(52) U.S. Cl.
CPC ......... *H04L 65/607* (2013.01); *G06Q 10/1095* (2013.01); *H04L 43/08* (2013.01); *H04L 65/4069* (2013.01); *H04L 65/602* (2013.01); *H04L 67/02* (2013.01); *H04L 67/06* (2013.01); *H04L 67/10* (2013.01)

(58) Field of Classification Search
None
See application file for complete search history.

(56) References Cited

U.S. PATENT DOCUMENTS

| | | |
|---|---|---|
| 8,280,988 B1 | 10/2012 | Parekh et al. |
| 2002/0133821 A1 | 9/2002 | Shteyn |
| 2007/0150502 A1 | 6/2007 | Bloebaum et al. |
| 2013/0238640 A1 | 9/2013 | Jones et al. |

OTHER PUBLICATIONS

IBM et al., "Method for selecting a subset of reading material to fit a specified available period of time", Original Publication Date: Sep. 11, 2006, IP.com No. IPCOM000140493D, IP.com Electronic Publication: Sep. 11, 2006, pp. 1-3.
U.S. Appl. No. 14/169,294, entitled "Partitioning Digital Media for Consumption", filed Jan. 31, 2014.

*Primary Examiner* — Brian P Whipple
(74) *Attorney, Agent, or Firm* — Isaac J. Gooshaw

(57) ABSTRACT

Embodiments of the present invention partition digital media content. One or more processors identify an episode of digital media content based on subscription preferences of a user. The one or more processors respond to a determination that a duration of the episode is less than or equal to a combined duration of two free time slots in an electronic calendar of a user by partitioning the episode into at least two segments. A first episode segment has a duration that is less than or equal to a duration of the first free time slot. A second episode segment has a duration that is less than or equal to the duration of the second free time slot. The one or more processors associate, in the electronic calendar, the first episode segment with the first time slot and the second episode segment with the second time slot.

20 Claims, 5 Drawing Sheets

PARTITIONING DIGITAL MEDIA FOR CONSUMPTION

FIELD OF THE INVENTION

The present invention relates generally to the field of digital media, and more particularly to partitioning digital media content for consumption.

BACKGROUND OF THE INVENTION

Availability of digital media, such as audio tracks or video clips, is expanding at a rapid pace. A common form of prescriptive digital media content comes from Rich Site Summary (RSS) feeds. RSS feeds are hosted on web servers and allow a user to subscribe to an episodic series of text, audio, or video content to be downloaded to computing devices such as a smart phone, tablet, or portable media player device. An RSS document includes full or summarized text, along with meta-data such as author's name, publishing date, and duration. The portable device constantly monitors the RSS website for updates to subscribed content, and automatically downloads the new electronic content from the host computer for consumption by the user at a later time. The selection of content, and the timing of downloads may be supported by a utility program that manages the subscription based on user preferences. An RSS reader allows the user to consume the received content offline at a convenient time.

Mobile devices, such as smart phones, tablets and portable media players, provide capabilities that were once the domain of desktop computers and laptops, such as accessing email, web browsing, reading RSS feeds, and accessing calendars for tracking meetings and appointments. Mobile calendaring applications often allow the user to set up events with alarms to notify the user of upcoming events, and provide information to the user about the event, such as topic, duration, links to electronic media content, etc.

SUMMARY

Embodiments of the present invention disclose a method, computer program product, and computer system for partitioning digital media content for consumption. One or more processors identify an episode of digital media content, wherein the identified first episode matches received user subscription preferences. The one or more processors respond to a determination that a duration of the episode is less than or equal to a combined duration of a first free time slot and a second free time slot in an electronic calendar of a user by partitioning the episode into at least two segments such that i) a first episode segment has a duration that is less than or equal to a duration of the first free time slot and ii) a second episode segment has a duration that is less than or equal to the duration of the second free time slot. The one or more processors associate, in the electronic calendar of the user, the first episode segment with the first time slot and the second episode segment with the second time slot.

DETAILED DESCRIPTION

Figure 1:
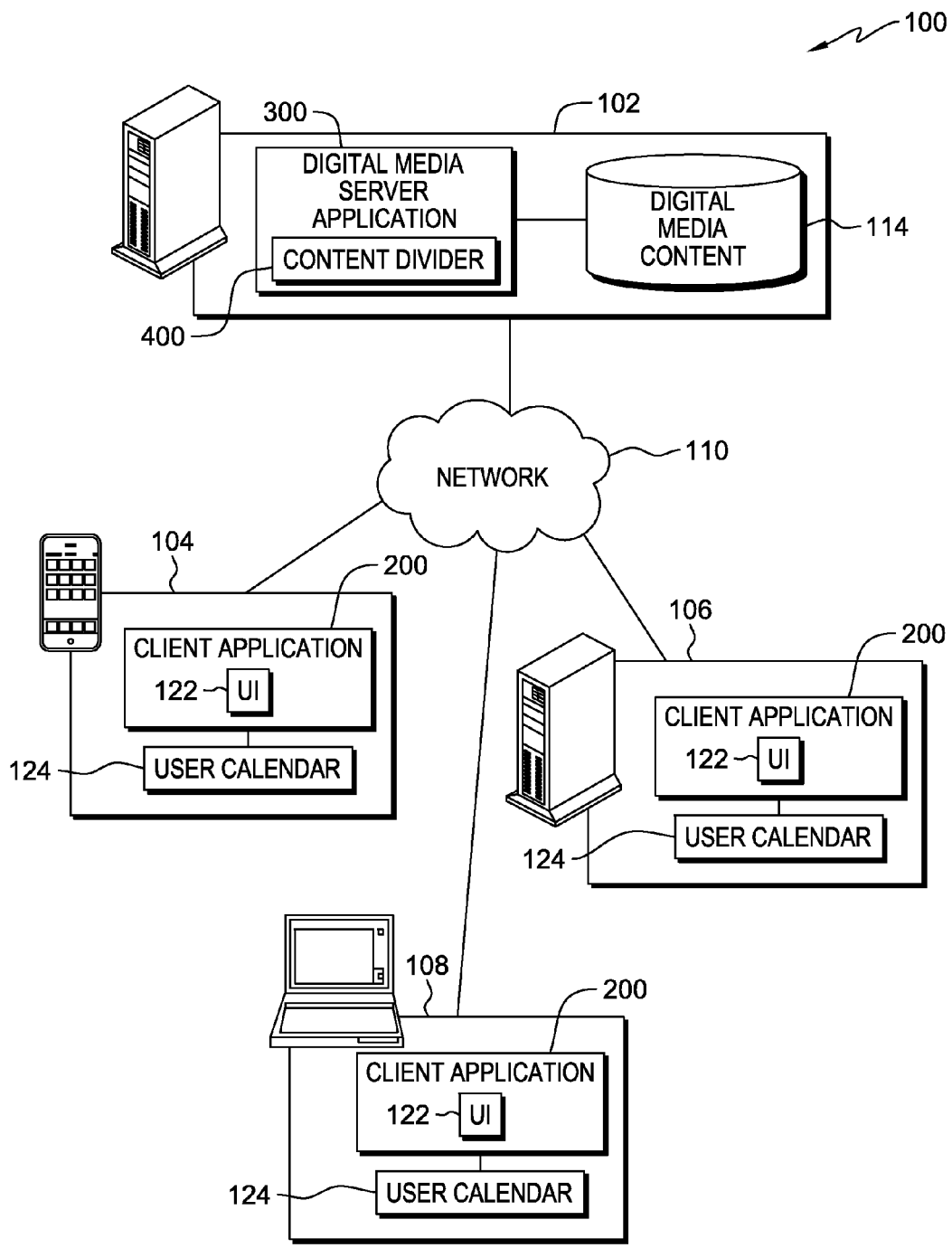
FIG. 1 is a functional block diagram illustrating a distributed data processing environment, in accordance with an embodiment of the present invention.

As the amount of available digital media, such as e-books, audio tracks or video clips increases, finding time to listen or watch selected media becomes difficult. Most users subscribe to multiple Rich Site Summary (RSS) feeds, but do not set aside enough time to consume the content they have downloaded. Embodiments of the present invention provide for partitioning digital media content into smaller segments for fitting into a list of free time slots on an electronic personal calendar, and displaying entries on the calendar to aid in consuming the segments. Implementation of embodiments of the invention may take a variety of forms, and exemplary implementation details are discussed subsequently with reference to the figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the figures. FIG. 1 is a functional block diagram illustrating a distributed data processing environment, generally designated 100, in accordance with an embodiment of the present invention. Distributed data processing environment 100 includes server computer 102, and client computers 104, 106, and 108, interconnected over network 110.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computer 102, and client computers 104, 106, and 108, in accordance with a desired embodiment of the present invention.

Server computer 102 may be a specialized server computer, a laptop computer, tablet computer, netbook computer, personal computer (PC), a desktop computer, a personal digital assistant (PDA), a smart phone, or any programmable electronic device capable of communicating with client computers 104, 106, and 108, via network 110. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computing devices via a network. Server computer 102 may be a node in a distributed database management environment. Server computer 102 may include internal and external hardware components, as depicted and described in further detail with respect to FIG. 5.

Server computer 102 includes an instance of digital media server application 300, content divider 400, and digital media content 114. In the depicted environment, digital media server application 300 is an application with capabilities including, but not limited to, allowing users to select, subscribe to, purchase, download, and manage digital media assets, which are stored on a server, such as server computer 102, and downloaded or streamed to a client computer, such as client computers 104, 106, and 108. In other embodiments of the present invention, digital media server application 300, content divider 400, and digital media content 114 may be on one computer, or more than one computer, and each item itself may be split into a plurality of parts or modules and spread across more than one computer. In any configuration, the following is maintained: digital media server application 300 is connected to content divider 400, and digital media content 114.

In an embodiment of the present invention, digital media server application 300 retrieves requested digital media content from digital media content 114, and uses content divider 400 to partition the retrieved digital media content to fit in two or more of the user's free time slots on an electronic calendar. Digital media content 114 is a collection or database of digital media content files including, but not limited to, text files, audio tracks, or video clips stored on server computer 102, or coupled to server computer 102 via network 110. Content divider 400 may be fully integrated, partially integrated or completely separate from digital media server application 300. Content divider 400 is described further in FIG. 4. Digital media server application 300 is described further in FIG. 3.

In various embodiments of the present invention, client computers 104, 106, and 108 can each respectively be a laptop computer, a tablet computer, an application server, a business email and calendar server, a netbook computer, a personal computer (PC), a desktop computer, a personal digital assistant (PDA), a smartphone, a portable media player, or any programmable electronic device capable of communicating with server computer 102 via network 110.

Client computers 104, 106, and 108 may each respectively include an instance of client application 200, which executes locally on the respective client computer and has the capability to connect to digital media server application 300 on server computer 102 via network 110. Client application 200 sends information to and receives information from server computer 102 over network 110. In the depicted environment, client application 200 is an application with capabilities including, but not limited to, allowing users to select, purchase, subscribe, download, and play various digital media content. Client application 200 may be any program capable of connecting to digital media server application 300 for the purpose of requesting digital media server application 300 to perform some task. In some embodiments, client application 200 may be an associated client application created by the vendor or developer of digital media server application 300 for use in a server-client environment. In the depicted environment, client application 200 uses a user interface, such as UI 122, to receive user input, and to output responses to a user. In various embodiments of the invention, client application 200 accesses user calendar 124 to identify free time slots, and to add calendar events in those free time slots with details for consuming digital media content which was partitioned by content divider 400 to fit in two or more free time slots. In alternate embodiments, client application program 200 may reside on server computer 102. Client application 200 is described further in FIG. 2.

User calendar 124 is accessible by client application 200, and may reside on the same client computer as client application 200, or may reside on a different client computer, such as client computers 106, or 108. For example, user calendar 124 may reside on the user's laptop computer, but an instance of client application 200 residing on a smartphone or tablet can access or edit user calendar 124. User calendar 124 may be viewed by client application 200, and may receive input from client application 200 to add one or more events to user calendar 124, including a link to digital media content. When a link to digital media content is selected by a user, user calendar 124 uses client application 200 to retrieve and display the digital media content.

UI 122 may utilize a web page application, a command line processor, or any other graphical user interface (GUI). UI 122 includes components used to receive input from a user and transmit the input to client application 200 residing on the respective client computer. In an embodiment, UI 122 uses a combination of technologies and devices, such as device drivers, to provide a platform to enable users of client computers 104, 106, and 108 to interact with client application 200. In the exemplary embodiment, UI 122 receives input, such as a selection from a list of items, the selection received from a physical input device, such as a keyboard or mouse, via a device driver that corresponds to the physical input device.

In the illustrative embodiment of the present invention, client application 200 manages the user's subscriptions to episodes of digital media content from providers of prescriptive digital media, such as various RSS feeds. Client application 200, running on client computer 104, has the ability to access the user's electronic calendar, such as user calendar 124, to identify all available free time slots within a specified beginning and end time for each day of the week according to user preferences. Upon identifying two or more free time slots on user calendar 124, client application 200 sends a request for content to digital media server application 300. Digital media server application 300 receives a request for digital media content from client application 200 via network 110. The request includes user subscription details and criteria regarding the number of free time slots and duration of each free time slot. Digital media server application 300 processes the request, and sends the partitioned digital media content, or a link to it, back to client application 200.

In various embodiments, digital media server application 300 running on server computer 102 receives a request for digital media content from client application 200 running on client computer 104 via network 110. In other embodiments, a request for digital media content may come from client application 200 running on client computers 106 or 108. In another embodiment, a request for digital media content may come from within server computer 102 through a server version of client application 200. Digital media server application 300 retrieves the requested digital media content from digital media content 114. Digital media server application 300 compares the duration of the free time slots with the durations of each retrieved episode of digital media content. Digital media server application 300 uses content divider 400 to partition the retrieved digital media content into segments to fit within two or more of the user's free time slots. Digital media server application 300 sends the partitioned digital media content, or links to it, to client application 200 on the requesting computer, such as client computer 104 via network 110. Client application 200 adds calendar entries to free time slots on user calendar 124 with links to the partitioned digital media content. The user may then consume the partitioned digital media content through UI 122 by viewing the calendar during the associated free time and clicking on a link.

Figure 2:
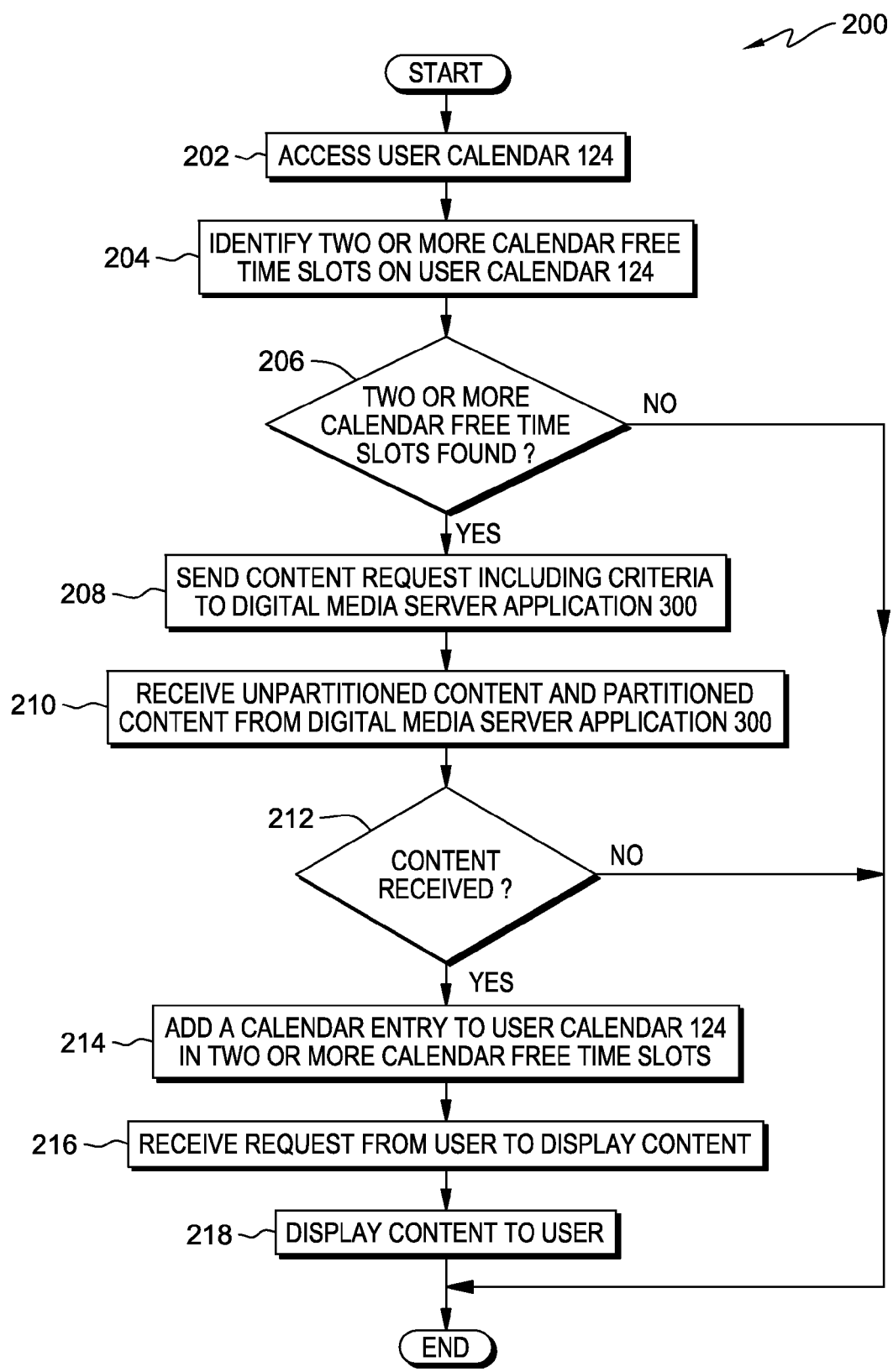
FIG. 2 is a flowchart depicting the operational steps of a client application for scheduling of digital media content consumption, in accordance with an embodiment of the present invention.

FIG. 2 is a flowchart depicting the operational steps of a client application for scheduling of digital media content consumption, in accordance with an embodiment of the present invention. In the illustrative embodiment, client application 200 running on client computer 104 sends a request via network 110 to digital media server application 300 running on server computer 102. Digital media server application 300 returns partitioned digital media content from digital media content 114 to client application 200 for the purpose of scheduling on a user's calendar for later consumption.

In the illustrative embodiment of the present invention, client application 200 requests a user of client computer 104 to set up access to the user's electronic calendar, such as user calendar 124, by providing user credentials and access information about the application that manages the electronic calendar. Client application 200 accesses user calendar 124 through an application programming interface (API) of client application 200. User calendar 124 may reside on a smartphone, such as client computer 104, or may be accessible to client application 200 via network 110, such as through a business email and calendar server on a separate computer, such as client computer 108. Client application 200 receives user credentials and access information through UI 122, which may be entered upon each use, or stored within a data store of client application 200 for automatic retrieval. User credentials and access information may include, but is not limited to, username, email address, password, server address, and device name. Client application 200 accesses user calendar 124 (step 202).

Client application 200 identifies two or more calendar free time slots on user calendar 124 (step 204). Client application 200 examines user calendar 124 looking for available time between events, including, but not limited to, meetings, appointments, start of day, end of day, and indicated travel time. For each time slot between events, client application 200 calculates a duration of time, and labels it as a calendar free time slot (CFTS), such as CFTS1, CFTS2, CFTS3, etc. Travel time may also be included as a CFTS. Each CFTS has associated properties including, but not limited to, date, start time, end time, content preferences, and the calculated duration. Client application 200 performs the process of identifying calendar free time slots on demand from the user, or at different intervals, for example, daily, or weekly, depending on input from the user, or previously defined defaults, which are stored by client application 200. Content preferences for any CFTS within specific time ranges may also be input from the user and stored in client application 200. For example, digital media content selected during work hours may come from different RSS feeds than digital media content selected for after dinner, as in educational content versus entertainment content. Also, a CFTS created during travel time may include content preferences, such as limiting content to audio only.

Client application 200 determines if two or more calendar free time slots are found (decision block 206). If client application 200 determines that only one or no calendar free time slots are found (no branch, decision block 206), client application 200 does not add calendar entries to user calendar 124. If desired, client application 200 may display a message to the user via UI 122 denoting that no entries have been added to the calendar. No further processing is required by client application 200.

If client application 200 determines that two or more calendar free time slots are found (yes branch, decision block 206), client application 200 sends the digital media content request including all criteria to digital media server application 300 (step 208). Client application 200 creates a request for digital media content to fit within a list of calendar free time slots, such as CFTS1, CFTS2, and CFTS3, for a specified time frame, such as one day. Client application 200 incorporates the properties, e.g., duration and content preferences, for each CFTS into the digital media content request to be sent to digital media server application 300. Client application 200 manages the user's subscriptions to digital media content from various providers, such as RSS feeds. Client application 200 stores the subscription information for each user within client application 200, or in a connected data store. Client application 200 incorporates the user subscription details into the same digital media content request to be sent to digital media server application 300.

Client application 200 receives unpartitioned and partitioned digital media content from digital media server application 300 (step 210). The unpartitioned digital media content includes an episode which fits within a single CFTS, and does not need to be segmented. The partitioned digital media content received from digital media server application 300 includes two or more segments of at least one episode of digital media content which was segmented and assigned to two or more sequential CFTSs. Client application 200 either downloads and stores the digital media content onto client computer 104, or it receives a link to the digital media content to be used later. Along with the content or link, client application 200 receives information from digital media server application 300 matching each received segment of digital media content to a specific CFTS.

Client application 200 determines if digital media content was received (decision block 212). If client application 200 determines that digital media content was not received (no branch, decision block 212), client application 200 does not add calendar entries to user calendar 124. If desired, client application 200 may display a message to the user via UI 122 denoting that no entries have been added to the calendar. No further processing is required by client application 200.

If client application 200 determines that digital media content was received (yes branch, decision block 212), client application 200 adds a calendar entry to user calendar 124 in two or more calendar free time slots (step 214). For each segment of digital media content received, client application 200 adds a calendar entry on user calendar 124 in the date and time range defined by the properties of the related CFTS. If there are multiple segments of digital media content from different episodes assigned to the same CFTS, the calendar entry will be updated to include the multiple segments. An example of a title of a calendar entry may be: "(3) Segments available for view during this time". The calendar entry for each CFTS may be formatted to include items such as title of segment, duration of segment, and a link to each available segment of digital media content. The link may be to a previously downloaded file on client computer 104, or to a link to a file or section of a file on the web for streaming. The added calendar entry may contain an alert function which displays at least a portion of user calendar 124 to the user via UI 122 at the start of each CFTS containing digital media content. In some embodiments, each sequential segment of digital media content may be matched or assigned to a later CFTS, such that the segments will be consumed in order.

Client application 200 receives a request from a user to display content (step 216). Upon viewing user calendar 124, or a calendar entry alert from user calendar 124, a user may select a link within a calendar entry that points to a segment of digital media content. Client application 200 uses the link to retrieve the digital media content either from a downloaded location on client computer 104, or from a web server, such as server computer 102. Client application 200 provides or accesses the tools for playing the digital media content, using one or more of audio, video, or textual display. Client application 200 displays the retrieved digital media content to the user through UI 122 (step 218).

Figure 3:
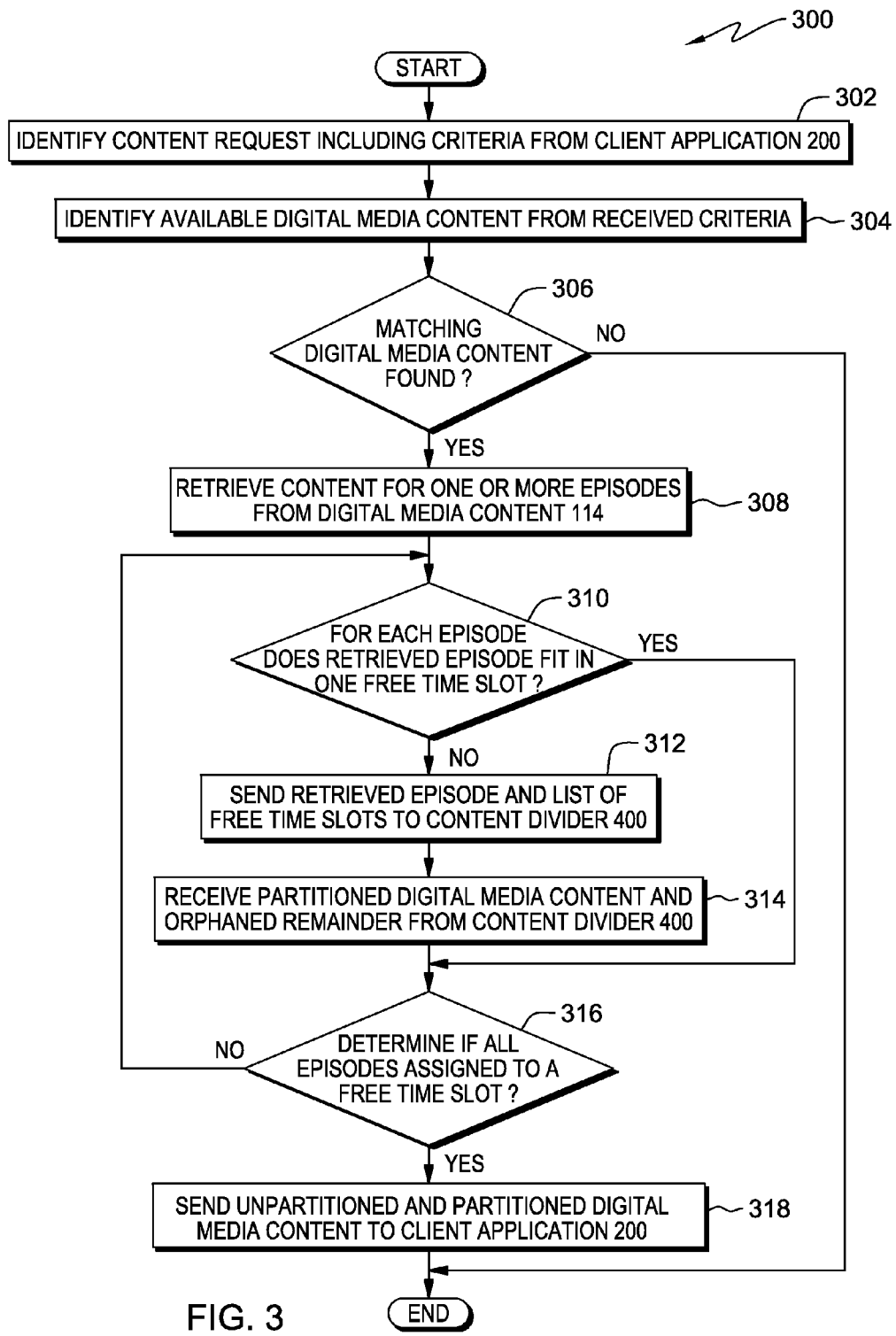
FIG. 3 is a flowchart depicting the operational steps of a digital media server application for providing digital media content, in accordance with an embodiment of the present invention.

FIG. 3 is a flowchart depicting the operational steps of a digital media server application for providing digital media content, in accordance with an embodiment of the present invention. Digital media server application 300 receives a request for digital media content from client application 200, retrieves the digital media content, uses content divider 400 to partition the retrieved digital media content, and sends the partitioned digital media content to client application 200 on client computer 104 via network 110.

Digital media server application 300 identifies a content request including criteria from client application 200 (step 302). The digital media content request identified from client application 200 includes criteria, not limited to, the user's subscription details, and the duration and content preferences for each CFTS within a list of calendar free time slots, such as CFTS1, CFTS2, and CFTS3. Criteria may also include an option for rejection of content too long to fit within the sum of available calendar free time slots. Content preferences for each CFTS include one or more of video, audio, text, or some other form of digital media. For example, travel time may be limited to audio only.

Digital media server application 300 identifies available digital media content from the received criteria (step 304). Utilizing the user's subscription details, digital media server application 300 connects to the website associated with the RSS feeds to look for updates. The monitoring of the website for updates may happen on demand or on a schedule set by the user. Updates are identified individually as episodes of digital media content. RSS subscriptions are only one type of digital media content, and the invention is not limited to this type of content, or this type of connection to content. A person skilled in the art will recognize that there are many types of digital media content available for use by digital media server application 300.

Digital media server application 300 determines if matching digital media content is found (decision block 306). If digital media server application 300 determines matching digital media content is not found (no branch, decision block 306), then digital media server application 300 does not return digital media content. Digital media server application 300 may send a message to client application 200 indicating that no matching content was found. No further processing is required by digital media server application 300. Digital media server application 300 identifies the meta-data of the subscribed digital media content to determine if it matches the content preferences for each CFTS in the list of calendar free time slots. If the content preference for an available CFTS is audio only, and the meta-data of the retrieved digital media content is video only, then digital media server application 300 will determine matching digital media content is not found.

If digital media server application 300 determines matching digital media content is found (yes branch, decision block 306), then digital media server application 300 retrieves content for one or more matching episodes from digital media content 114 (step 308). In some embodiments, digital media content 114 represents a storage location for digital media content related to an RSS feed. Digital media content 114 may be any data store, such as a database or collection of files, connected to a website application server, such as server computer 102. Digital media server application 300 retrieves the identified digital media content by downloading one or more episodes or files onto server computer 102, or into memory of server computer 102 for processing. For each retrieved episode, digital media server application 300 determines if the retrieved episode of digital media content fits the duration of at least one CFTS of a list of calendar free time slots (decision block 310). Digital media server application 300 compares the duration of the retrieved episode of digital media content with the duration of each CFTS in the list of calendar free time slots. If the duration of the episode is equal to or less than at least one of the CFTS, then digital media server application 300 determines the retrieved episode of digital media content fits the duration of at least one CFTS (yes branch, decision block 310). If the retrieved episode of digital media content fits within one time slot, there is no need to create segments of the content, steps 312 to 314 are skipped, and digital media server application 300 determines if all retrieved episodes have been assigned to a free time slot (decision block 316).

If the duration of the episode is greater than each of the CFTSs in the list of calendar free time slots, then digital media server application 300 determines the retrieved episode of digital media content does not fit the duration of one CFTS (no branch, decision block 310). Digital media server application 300 sends the retrieved episode of digital media content and the list of calendar free time slots to content divider 400 (step 312).

If the duration of the episode is greater than the summed duration of all of the CFTSs in the list of calendar free time slots, then there are not enough time slots available in the searched time frame to contain the entire episode. Digital media server application 300 stores the remaining portion to process the next time digital media server application 300 performs the task of scheduling digital media content for consumption. In an alternate embodiment, digital media server application 300 may reject the episode as not matching in step 306. The ability to reject the episode may be part of the selection criteria passed in step 302.

Digital media server application 300 receives partitioned digital media content and orphaned remainder from content divider 400 (step 314). The partitioned digital media content received from content divider 400 includes two or more segments of one episode of digital media content which was segmented and related to two or more CFTSs. Digital media server application 300 receives either two or more files containing the content, or two or more links to the digital media content. Along with the content files or links, digital media server application 300 receives information from content divider 400 regarding the assignment of each segment of digital media content to a specific CFTS. In the case where a remaining portion of an episode exists after all previous segments have been assigned to the available free time slots, the remainder, or orphan, is stored for later processing. Digital media server application 300 receives any orphaned remainder of a processed episode from content divider 400 to store for processing the next time digital media server application 300 performs the task of scheduling digital media content for consumption. Digital media server application 300 may also send a message to client application 200 indicating an orphaned remainder exists. Client application 200 may send a message to the user via UI 122 indicating an orphaned remainder exists and offering an option to expand the time frame for identifying calendar free time slots and reprocessing the content request.

Digital media server application 300 determines if all retrieved episodes have been assigned to a free time slot (decision block 316). If digital media server application 300 determines that all retrieved episodes have not been assigned to a free time slot (no branch, decision block 316), then digital media server application 300 determines if the next episode of digital media content fits the duration of at least one CFTS of the list of calendar free time slots (decision block 310). Digital media server application 300 loops through steps 310 through 316, as previously described, until all retrieved episodes of digital media content have been processed.

If digital media server application 300 determines that all retrieved episodes have been assigned to a free time slot (yes branch, decision block 316), then digital media server application 300 sends unpartitioned and partitioned digital media content to client application 200 (step 318). The unpartitioned digital media content includes any episode which fits within a single CFTS, and does not need to be segmented. The partitioned digital media content includes two or more segments of any one episode of digital media content which was segmented and related to two or more CFTSs. Digital media server application 300 sends the available unpartitioned content and partitioned content to client application 200 at the same time, or may send them at different times. Digital media server application 300 sends the unpartitioned content and partitioned content as either one or more files containing the content or one or more links to the digital media content. A person skilled in the art will recognize that there are many ways to send the unpartitioned and partitioned content to client application 200.

Figure 4:
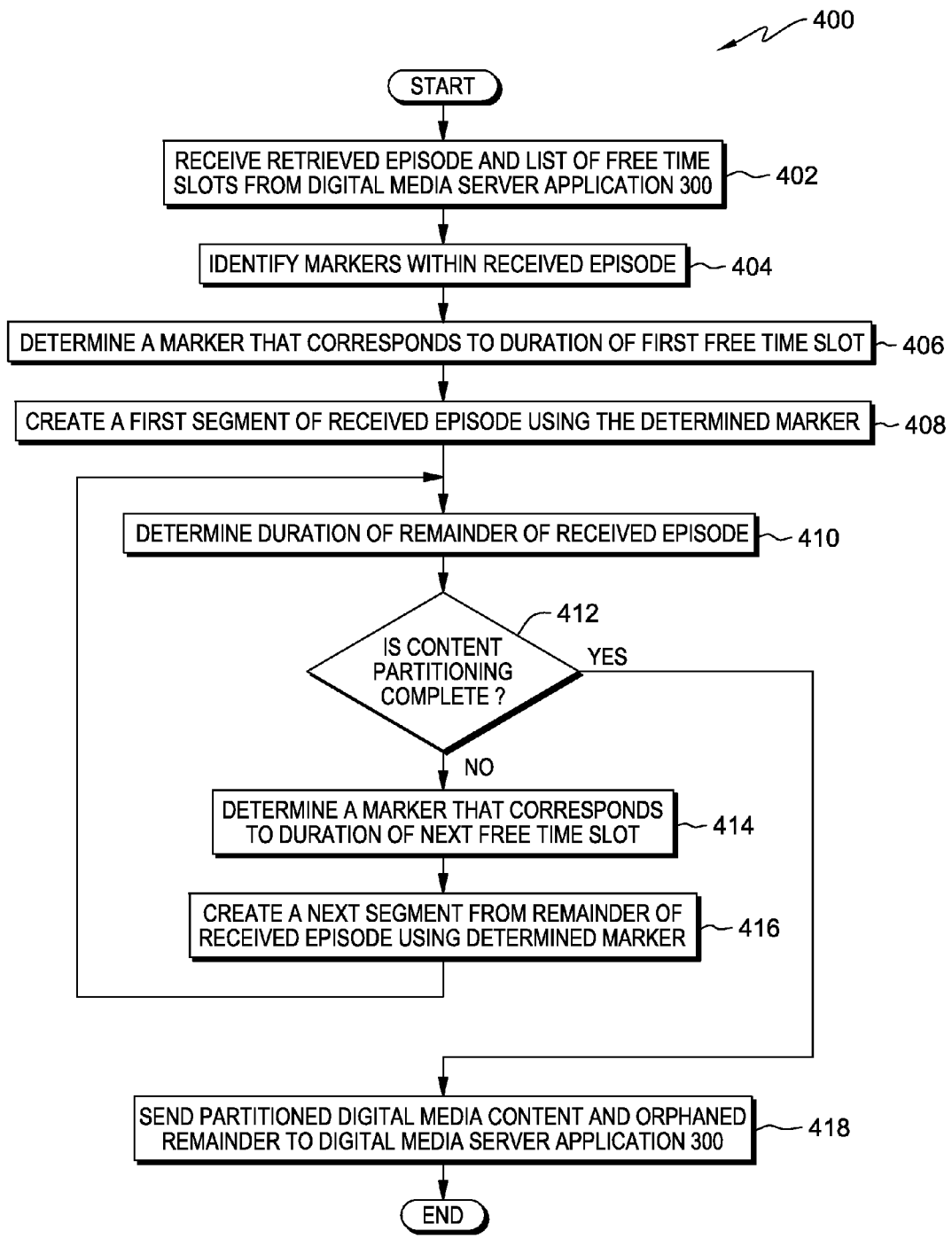
FIG. 4 is a flowchart depicting the operational steps of a content divider for partitioning digital media content for consumption, in accordance with an embodiment of the present invention.

FIG. 4 is a flowchart depicting the operational steps of a content divider for partitioning digital media content for consumption, in accordance with an embodiment of the present invention. Content divider 400 receives a request from digital media server application 300 to partition a retrieved episode of digital media content to fit within two or more of the user's calendar free time slots.

Content divider 400 receives a retrieved episode of digital media content and the list of two or more free time slots from digital media server application 300 (step 402). The received episode of digital media content has been previously determined to not fit wholly in the duration of any one free time slot in the list of free time slots by digital media server application 300. Content divider 400 receives a list of two or more calendar free time slots, such as CFTS1, CFTS2, and CFTS3. For example, a sixty minute episode of digital media content titled "Weekly Tech News Ep. 305", subscribed to by the user has been passed to content divider 400, along with criteria for CFTS1, CFTS2, and CFTS3, which have durations of thirty minutes, twenty minutes, and ten minutes respectively.

Content divider 400 identifies markers within the received episode of digital media content (step 404). When an episode of digital media content is initially created, identifiable markers are placed within the episode, or within the episode file meta-data, to facilitate partitioning the digital media content. For example, markers may be placed at locations within the received episode corresponding to a unit of time, such as every five or ten minutes, or at locations where the subject matter may easily be broken up, such as the end of a paragraph or story, or at the end of an action sequence, similar to chapters in a DVD movie. Each marker is defined by a time in relation to the start of the episode.

Content divider 400 determines a marker that corresponds to a duration of a first free time slot (step 406). Content divider 400 determines which marker within the received episode creates a first segment which is less than or equal to the duration of the first free time slot in the received list of consecutive free time slots. In the example, CFTS1 has a duration of thirty minutes. Content divider 400 reads the meta-data of the received episode file, and determines that MARKER6 divides the episode file into a first piece that is thirty minutes long, and a second piece which holds the remaining content. Content divider 400 determines that MARKER6 corresponds to the duration of time associated with CFTS1.

Content divider 400 creates a first segment of the received episode using the determined marker (step 408). In the example, content divider 400 creates the first segment, i.e., SEGMENT1, from the received episode of digital media content by dividing the content file at MARKER6, or thirty minutes into the content. The segment may either be a new file shortened from the original, a link to the new file, or a link to the original file which includes variables that detail the start and end times. SEGMENT1 may be formatted with meta-data including the duration, and is matched with CFTS1. User preferences may include partitioning criteria such as, the minimum duration of orphans, or the maximum number of segments which may be created from a single episode of digital media content. A person skilled in the art will recognize that there are many ways to define a segment of a file.

Content divider 400 determines a duration of the remainder of the received episode (step 410). Content divider 400 subtracts the time of the determined marker from the original duration of the received episode to determine a duration of the remainder of the received episode to be stored in a variable, i.e. REMAINDER.

Content divider 400 determines if content partitioning is complete (decision block 412). Partitioning is complete when REMAINDER is zero. If content divider 400 determines that REMAINDER is zero, then content partitioning is complete (yes branch, decision block 412), and no further segments need to be created. Content divider 400 sends any created segments to digital media server application 300 (step 418), and no further processing is required by content divider 400.

If content divider 400 determines that REMAINDER is greater than zero, but no more free time slots exist in the list of calendar free time slots, then partitioning is complete as there are not enough time slots available to contain the entire episode (yes branch, decision block 412). Content divider 400 sends the orphaned remainder of the episode to digital media server application 300 (step 418) to store the remaining portion for processing the next time digital media server application 300 performs the task of scheduling digital media content for consumption, and no further processing is required by content divider 400.

If content divider 400 determines that REMAINDER is greater than zero, and there are still unmatched free time slots in the list of calendar free time slots, then content partitioning is not complete (no branch, decision block 412), then content divider 400 determines a marker that corresponds to the duration of the next free time slot (step 414). Content divider 400 determines which marker within the received episode creates a next segment which starts with the previous determined marker, and which is less than or equal to the duration of the next sequential free time slot in the received list of free time slots. In the example, CFTS2 has a duration of twenty minutes. Content divider 400 reads the meta-data of the received episode file, and determines that MARKER10 divides the episode file from MARKER6 to MARKER10 into a next segment which is twenty minutes long. Content divider 400 subtracts the time of the new determined marker from the original duration of the received episode to determine the duration of the remainder of the received episode, and stores the shorter duration in the previously defined variable, i.e. REMAINDER.

Content divider 400 creates a next segment from the remainder of the received episode using the determined marker (step 416). Content divider 400 creates the next segment from the received episode of digital media content by dividing the content file between the determined marker and the previously determined marker. The loop of steps 410 through 416 may continue until REMAINDER is zero, after forming multiple segments from the original received episode of digital media content.

In the example, on the first time through the loop, content divider 400 creates the next segment, i.e., SEGMENT2, from the received episode of digital media content by partitioning the episode file between MARKER6 and MARKER10, or twenty minutes into the remaining content. In the second time through the loop, content divider 400 creates the next segment, i.e., SEGMENT3, from the received episode of digital media content by partitioning the episode file between MARKER10 and MARKER12, or ten minutes into the remaining content. At this point, REMAINDER is zero, content partitioning is complete (yes branch, decision block 412), the loop is finished, and no further segments need to be created.

Content divider 400 sends partitioned digital media content and orphaned remainder to digital media server application 300 (step 418). In the example, content divider 400 sends SEGMENT1, SEGMENT2, and SEGMENT3 to digital media server application 300. The transmitted segments may each be a new file shortened from the original, a link to the new file, or a link to the original file which includes variables that detail the start and end times of the segment. Content divider 400 sends any orphaned remainder of the episode to digital media server application 300 to store for processing the next time digital media server application 300 performs the task of scheduling digital media content for consumption, and no further processing is required by content divider 400.

Figure 5:
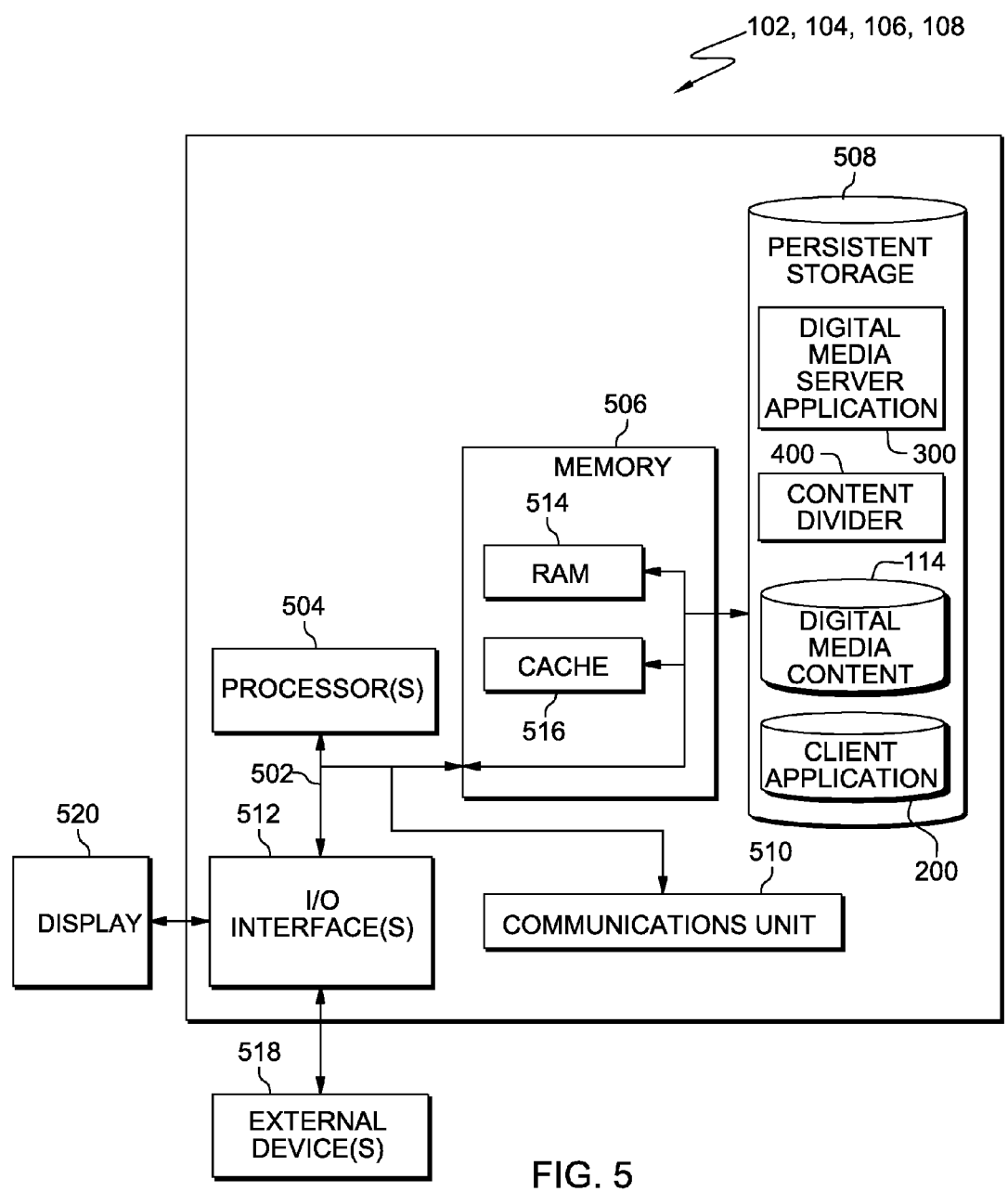
FIG. 5 depicts a block diagram of components of an exemplary computer system for implementing embodiments of the present invention.

FIG. 5 depicts a block diagram of respective components of server computer 102 and client computers 104, 106, and 108, in accordance with an illustrative embodiment of the present invention. It may be appreciated that FIG. 5 provides only an illustration of one implementation and does not imply any limitations with regard to the environments in which different embodiments may be implemented. Many modifications to the depicted environment may be made.

Server computer 102 and client computers 104, 106, and 108, each include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Digital media server application 300, content divider 400, digital media content 114, and client application 200 are stored in respective persistent storage 508 for execution and/or access by one or more of the further respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of server computer 102, and client computers 104, 106, and 108. In these examples, communications unit 510 includes one or more network interface cards. Communications unit 510 may provide communications through the use of either or both physical and wireless communications links. Digital media server application 300, content divider 400, digital media content 114, and client application 200 may be downloaded to respective persistent storage 508 through communications unit 510.

I/O interface(s) 512 allows for input and output of data with other devices that may be connected to server computer 102, and client computers 104, 106, and 108. For example, I/O interface 512 may provide a connection to external device(s) 518 such as a keyboard, a keypad, a touch screen, and/or some other suitable input device. External device(s) 518 can also include portable computer-readable storage media such as, for example, thumb drives, portable optical or magnetic disks, and memory cards. Software and data used to practice embodiments of the present invention, e.g., digital media server application 300, content divider 400, digital media content 114, and client application 200, can be stored on such portable computer-readable storage media and can be loaded onto respective persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:
1. A method for partitioning digital media content, the method comprising:
identifying, by one or more processors, an episode of digital media content, wherein an identified first episode matches received user subscription preferences;
responsive to a determination that a duration of the episode is less than or equal to a combined duration of a first free time slot and a second free time slot in an electronic calendar of a user, partitioning, by the one or more processors, the episode into at least two segments such that i) a first episode segment has a duration that is less than or equal to a duration of the first free time slot and ii) a second episode segment has a duration that is less than or equal to the duration of the second free time slot; and associating, by the one or more processors, in the electronic calendar of the user, the first episode segment with the first time slot and the second episode segment with the second time slot.

2. The method of claim 1, further comprising:

identifying, by the one or more processors, a digital media content request which includes user subscription preferences and a list of two or more free time slots from the electronic calendar, wherein each of the two or more free time slots in the electronic calendar have associated durations and preferences; and retrieving, by the one or more processors, the episode of digital media content from a data store.

3. The method of claim 1, wherein associating, by the one or more processors, in the electronic calendar of the user, the first episode segment with the first time slot and the second episode segment with the second time slot further comprises:

adding, by the one or more processors, an entry to the first free time slot that includes a first link to the first episode segment and an entry to the second free time slot that includes a second link to the second episode segment.

4. The method of claim 1, further comprising:

querying, by the one or more processors, the electronic calendar to determine an available time slot between two or more scheduled events;

calculating, by the one or more processors, a duration of the available time slot;

determining, by the one or more processors, one or more preferences for digital media content and the available time slot, wherein the one or more preferences include one or more preferences for video, audio, or text content; and adding, by the one or more processors, the available time slot and one or more preferences to the electronic calendar.

5. The method of claim 1, further comprising:

identifying, by the one or more processors, meta-data related to the episode of digital media content;

determining, by the one or more processors, the duration of the episode based, at least in part, the meta-data; and determining, by the one or more processors, whether the meta-data of the episode matches preferences of the first free time slot and the second free time slot in the electronic calendar.

6. The method of claim 1, wherein partitioning the episode into at least two segments comprises:

adding, by the one or more processors, one marker to the episode such that the marker indicates a point of partition that separates the first segment and the second segment; and generating, by the one or more processors, the first segment and the second segment from the episode based, at least in part, on a location of the marker.

7. The method of claim 1, further comprising:

selecting, by the one or more processors, the first free time slot and the second free time slot based, at least in part, on the duration and a content type of the episode compared to the respective durations and associated preferences of a plurality of available time slots included in the electronic calendar.

8. A computer program product for partitioning digital media content, the computer program product comprising:

a computer-readable storage medium and program instructions stored on the computer-readable storage medium, the program instructions comprising:

program instructions to identify an episode of digital media content, wherein an identified first episode matches received user subscription preferences;

program instructions to respond to a determination that a duration of the episode is less than or equal to a combined duration of a first free time slot and a second free time slot in an electronic calendar of a user by partitioning the episode into at least two segments such that i) a first episode segment has a duration that is less than or equal to a duration of the first free time slot and ii) a second episode segment has a duration that is less than or equal to the duration of the second free time slot; and program instructions to associate, in the electronic calendar of the user, the first episode segment with the first time slot and the second episode segment with the second time slot.

9. The computer program product of claim 8, further comprising:

program instructions to identify a digital media content request which includes user subscription preferences and a list of two or more free time slots from the electronic calendar, wherein each of the two or more free time slots in the electronic calendar have associated durations and preferences; and program instructions to retrieve the episode of digital media content from a data store.

10. The computer program product of claim 8, wherein the program instructions to associate, in the electronic calendar of the user, the first episode segment with the first time slot and the second episode segment with the second time slot further comprise:

program instructions to add an entry to the first free time slot that includes a first link to the first episode segment and an entry to the second free time slot that includes a second link to the second episode segment.

11. The computer program product of claim 8, the program instructions further comprising:

program instructions to query the electronic calendar to determine an available time slot between two or more scheduled events;

program instructions to calculate a duration of the available time slot;

program instructions to determine one or more preferences for digital media content and the available time slot, wherein the one or more preferences include one or more preferences for video, audio, or text content; and program instructions to add the available time slot and one or more preferences to the electronic calendar.

12. The computer program product of claim 8, the program instructions further comprising:

program instructions to identify meta-data related to the episode of digital media content;

program instructions to determine the duration of the episode based, at least in part, the meta-data; and program instructions to determine whether the meta-data of the episode matches preferences of the first free time slot and the second free time slot in the electronic calendar.

13. The computer program product of claim 8, wherein program instructions to partition the episode into at least two segments comprise:

program instructions to add one marker to the episode such that the marker indicates a point of partition that separates the first segment and the second segment; and program instructions to generate the first segment and the second segment from the episode based, at least in part, on a location of the marker.

14. The computer program product of claim 8, the program instructions further comprising:

program instructions to select the first free time slot and the second free time slot based, at least in part, on the duration and a content type of the episode compared to the respective durations and associated preferences of a plurality of available time slots included in the electronic calendar.

15. A computer system for partitioning digital media content, the computer system comprising:

one or more computer processors;

one or more computer-readable storage media;

program instructions stored on the computer-readable storage media for execution by at least one of the one or more processors, the program instructions comprising:

program instructions to identify an episode of digital media content, wherein an identified first episode matches received user subscription preferences;

program instructions to respond to a determination that a duration of the episode is less than or equal to a combined duration of a first free time slot and a second free time slot in an electronic calendar of a user by partitioning the episode into at least two segments such that i) a first episode segment has a duration that is less than or equal to a duration of the first free time slot and ii) a second episode segment has a duration that is less than or equal to the duration of the second free time slot; and program instructions to associate, in the electronic calendar of the user, the first episode segment with the first time slot and the second episode segment with the second time slot.

16. The computer system of claim 15, further comprising:

program instructions to identify a digital media content request which includes user subscription preferences and a list of two or more free time slots from the electronic calendar, wherein each of the two or more free time slots in the electronic calendar have associated durations and preferences; and program instructions to retrieve the episode of digital media content from a data store.

17. The computer system of claim 15, wherein the program instructions to associate, in the electronic calendar of the user, the first episode segment with the first time slot and the second episode segment with the second time slot further comprise:

program instructions to add an entry to the first free time slot that includes a first link to the first episode segment and an entry to the second free time slot that includes a second link to the second episode segment.

18. The computer system of claim 15, the program instructions further comprising:

program instructions to query the electronic calendar to determine an available time slot between two or more scheduled events;

program instructions to calculate a duration of the available time slot;

program instructions to determine one or more preferences for digital media content and the available time slot, wherein the one or more preferences include one or more preferences for video, audio, or text content; and program instructions to add the available time slot and one or more preferences to the electronic calendar.

19. The computer system of claim 15, the program instructions further comprising:

program instructions to identify meta-data related to the episode of digital media content;

program instructions to determine the duration of the episode based, at least in part, the meta-data; and program instructions to determine whether the meta-data of the episode matches preferences of the first free time slot and the second free time slot in the electronic calendar.

20. The computer system of claim 15, wherein program instructions to partition the episode into at least two segments comprise:

program instructions to add one marker to the episode such that the marker indicates a point of partition that separates the first segment and the second segment; and program instructions to generate the first segment and the second segment from the episode based, at least in part, on a location of the marker.

* * * * *